United States Patent [19]
Percival et al.

[11] Patent Number: 5,991,816
[45] Date of Patent: *Nov. 23, 1999

[54] IMAGE TRANSFER PROTOCOL IN PROGRESSIVELY INCREASING RESOLUTION

[75] Inventors: Jeffrey W. Percival, Madison, Wis.; Richard L. White, Baltimore, Md.

[73] Assignee: Wisconsin Alumni Research Foundation, Madison, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,243

[22] Filed: Dec. 13, 1996

[51] Int. Cl.⁶ .................................................. H04N 9/79
[52] U.S. Cl. ........................ 709/247; 709/200; 709/247; 382/240; 382/248; 382/276; 382/281; 348/399
[58] Field of Search ................................ 382/240, 248, 382/276, 281; 395/704; 709/200, 247; 348/399

[56] References Cited

U.S. PATENT DOCUMENTS

| | | | |
|---|---|---|---|
| 4,742,558 | 5/1988 | Ishibashi | 382/240 |
| 5,737,599 | 4/1998 | Rowe et al. | 395/615 |
| 5,754,702 | 5/1998 | Simpson | 382/240 |

OTHER PUBLICATIONS

High–Performance Compression of Astronomical Images, by Richard L. White, Joint Institute for Laboratory Astrophysics, University of Colorado 1993.

*Primary Examiner*—Dung C. Dinh
*Assistant Examiner*—Hieu C. Le
*Attorney, Agent, or Firm*—Quarles & Brady

[57] ABSTRACT

A method of transferring digital image data over a communication link transforms and orders the data so that, as data is received by a receiving station, a low detail version of the image is immediately generated with later transmissions of data providing progressively greater detail in this image. User instructions are accepted, limiting the ultimate resolution of the image or suspending enhancement of the image except in certain user defined regions. When a low detail image is requested followed by a request for a high detailed version of the same image, the originally transmitted data of the low resolution image is not discarded or retransmitted but used with later data to improve the originally transmitted image. Only a single copy of the transformed image need be retained by the transmitting device in order to satisfy requests for different amounts of image detail.

7 Claims, 4 Drawing Sheets

IMAGE TRANSFER PROTOCOL IN PROGRESSIVELY INCREASING RESOLUTION

This invention was made with United States government support awarded by NASA, Grant # NAG5-2694. The United States Government has certain right in this invention.

BACKGROUND OF THE INVENTION

The present invention relates to techniques for transmitting digitized images, and in particular to a technique for providing more rapid transmission of critical image information.

In the 1960s, the Department of Defense developed a distributed network of telephone lines linking computer systems known as the Internet. The Internet was first used primarily for transmitting text information, but in 1991, British scientist, Tim Berners-Lee invented the World Wide Web, which allowed images to be readily transmitted over the Internet along with or instead of text. The World Wide Web has greatly increased the amount of image information transmitted over the Internet. This increased image traffic is taxing the capacity of the Internet and the patience of its users who often must wait a considerable period of time for image transmission to be completed. The transformed image also requires less data for a complete loss-less transmission.

The transmission of images on the Internet or any similar capacity communications network is time-consuming as a result of the large amount of data represented by an image. For example, a color image displayed on a typical computer screen may have the equivalent of one hundred pages of text information. Even with present day high speed telephone lines and modems, transmission of an image may take many seconds. When a network connection is shared among many users, or if the users have slower hardware, transmission of pictures can take many minutes. In situations where multiple images need to be reviewed by a user, even modest transmission times can be unacceptable.

In order to reduce the amount of image data that must be transmitted, it is known to compress image data. Compression techniques include loss-less compression schemes in which the compressed image may be decompressed without loss of information, and lossy compression systems, where the compressed data is irreversibly degraded.

A loss-less compression system, for example, might recognize a pattern of consecutive pixels in the image and transmit a short code designating that pattern rather than transmitting the more lengthy values of the pixels themselves. A decompressing program at the receiving terminal, receiving the short code, inserts the designated pattern into the received stream of pixel data. The decompressed data can be identical to the data before compression.

A lossy compression system, as an example, may reduce the number of shades of gray of each pixel in the image, from 256 to eight. At the receiving site, the image is reconstructed in a degraded eight gray level form. Generally, lossy compression systems provide far greater compression than loss-less compression systems. In certain applications, however, lossy compression systems may be inappropriate. For example, in the transmission of diagnostic medical images, degradation of the image in a lossy compression transmission may obscure significant clinical information.

One method of addressing the problem of slow image transmission of high quality images, especially where multiple images must be reviewed by a user, is to first transmit an extremely compressed version of the image, typically a "postage stamp image" having much smaller size and less detail. A number of postage stamp images may be transmitted rapidly, viewed by the user, and one or more selected for its complete image to be transmitted in its entirety over a longer period of time. This two-step approach eliminates the need to transmit each of the images in their entirety, but entails additional overhead of transmitting the postage stamp images, data which will ultimately be discarded.

Different users of image data may have differing requirements for image quality. These different requirements may result from their different uses of the data, different limiting resolutions of the user's computer equipment, or different limiting bandwidths of the user's connections to the network. Ideally, each such user could be provided a different image having a different degree of data compression. Unfortunately, storing many different copies of the image with different degrees of compression may be impractical as a result of the large amount of memory required.

BRIEF SUMMARY OF THE INVENTION

The present invention provides a method of ordering image data for progressive transmission so that the initial data transmitted provides a low-detailed version of the entire image with additional data progressively enhancing the detail of that image when combined with the earlier data.

Because the entire image is presented to the receiving user early in the transmission process, the user may designate a limited portion of the image for further refinement thus eliminating or postponing the transmission of image data for areas of the image that are not of interest. Image transmission time is thus decreased.

Similarly, a number of postage stamp images may be transmitted initially and the user may select a limited set of these images for complete transmission. The postage stamp images may be constructed of an initial portion of the ordered image data and the complete image constructed of the postage stamp image data plus the remaining ordered image data. No image information need be discarded or transmitted twice in this process.

The image data may be transformed before the ordering so that the initial transmission of data provides visually significant portions of the entire image very early in the transmission process. This permits the user to interrupt the transmission sooner and permits the postage stamp images to be transmitted more quickly. The ordering also permits different users with different image quality requirements to receive images having an appropriate degree of detail simply by termination image data transmission before it is completed.

Specifically, the present invention provides a method of transmitting digital images from a transmission site to a reception site. A first step of the method orders the image data according to a predefined visual significance. This ordered data is then transmitted, in the order, for a first field of the digital image and received at the reception site to be displayed as it is received. A user, prior to completion of the transmission of the image data of the first field, may view the image and provide instructions defining a second field within the first field. These instructions may be received by the transmitting site causing it to continue the ordered transmission of the image data, excluding data not in the second field.

It is thus one object of the invention to shorten the amount of time necessary to transmit digital images by allowing the user to redefine the image field during the transmission process. Additional data for this redefined field is then transmitted before all other untransmitted data. The ordering of data, in this context, provides an initial low detail image of the entire image for the user to review and permits later data of a selected field to be combined with earlier data of the entire image to enhance the image of the selected field without discarding the earlier data.

Ordering of the image data may include the steps of performing a Haar transform on pixels of the digital image to produce a transformed image having corresponding transform pixels. The ordering of the data is such that mathematically more significant bits of each transform pixel are placed in the order before mathematically less significant bits of any other transform pixel.

Thus, it is another object of the invention to provide a simple and computationally efficient method of ordering image data that ensures that the earliest transmitted data produces an entire, albeit low detail image suitable for viewing by a user.

It is another object of the invention to provide an image transform that sends visually more significant data before visually less significant data. A property of the Haar transform and of the ordering is to provide a recognizable image very early in the transmission of the data. Thus the user may reselect an image field sooner and avoid a greater amount of image transmission.

The transmitting site may transmit only a first portion of the image data until, accepting from a viewer, instructions to produce an image of higher detail. At that time, the transmitting site may transmit a second portion of the image data which may be combined with the first portion of the image data at the reception site to produce the image of higher detail. The images formed of the first and second portions of the image data may be adjusted in size to have comparable spatial resolution, therefore making the first displayed image smaller than the second displayed image.

Thus, it is another object of the invention to permit the transmission of postage stamp images that, when selected, are combined with later transmitted data to produce full detailed images. The postage stamp image data is not discarded, simply augmented by the later transmission to enhance the detail of the postage stamp image.

The data may be first transformed by the Haar transform and the data of the second portion may be approximately equal in amount to the data of the first portion times four raised to an integer power.

Thus, it is another object of the invention to provide a set of postage stamp images that may be produced by the Haar transform by a simple partitioning of the Haar transform image. The Haar transform divided into quarters, an integer number of times, provides in its upper left hand corner, a complete image of progressively lower detail.

The transmission site may accept from the reception site a signal indicating a desired level of spatial resolution in an image and may order and transmit a first portion of the image data from the transmission site to the reception site where the size of the first portion is based on the signal from the reception site. The signal from the reception site may indicate a predetermined resolution of a display device at the reception site or a predetermined bandwidth of the communication link at the reception site.

Thus, it is another object of the invention to provide a method of transmitting image data that may adapt to varying requirements of image detail by different users without the need for storing multiple compressed image files. The ordering of the image data provides a progressive transmission that effectively provides different levels of compression determined simply by how long the transmission is allowed to continue. Thus, a single image file, depending on how long it is transmitted, provides many different levels of effective compression.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEW OF THE DRAWINGS

Figure 9A:
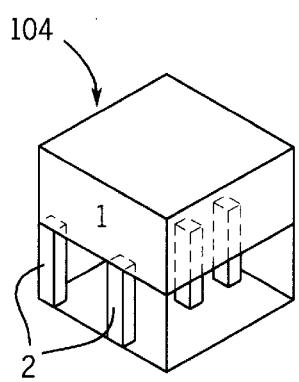
FIGS. 9a and 9b are representations of the data cube of FIG. 8 and the resulting transformed image for a first method of image transmission per the present invention.
Figure 10A:
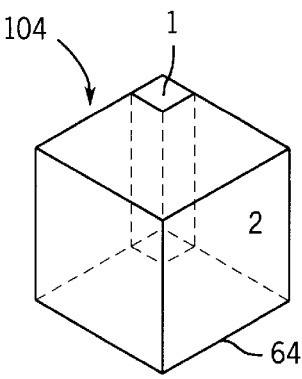
Figure 11A:
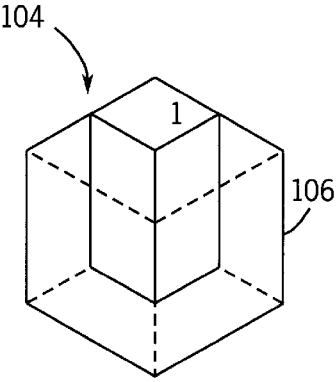
Figure 9B:
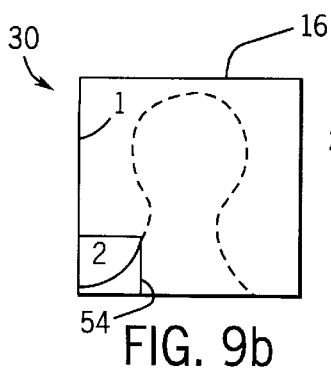
Figure 10B:
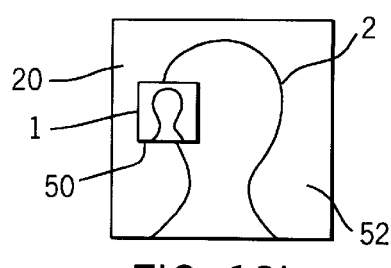
Figure 11B:
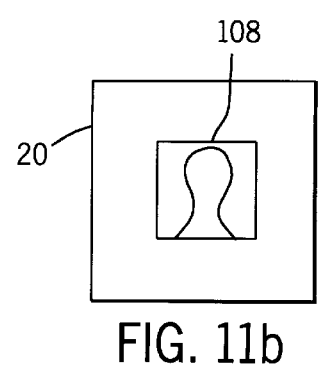

FIGS. 10a and 10b are figures similar to those of FIGS. 9a and 9b showing a second method of image transmission per the present invention; and FIGS. 11a and 11b are figures similar to those of FIGS. 9a and 9b showing a third method of image transmission per the present invention.

DETAILED DESCRIPTION OF THE INVENTION

Hardware

Figure 1:
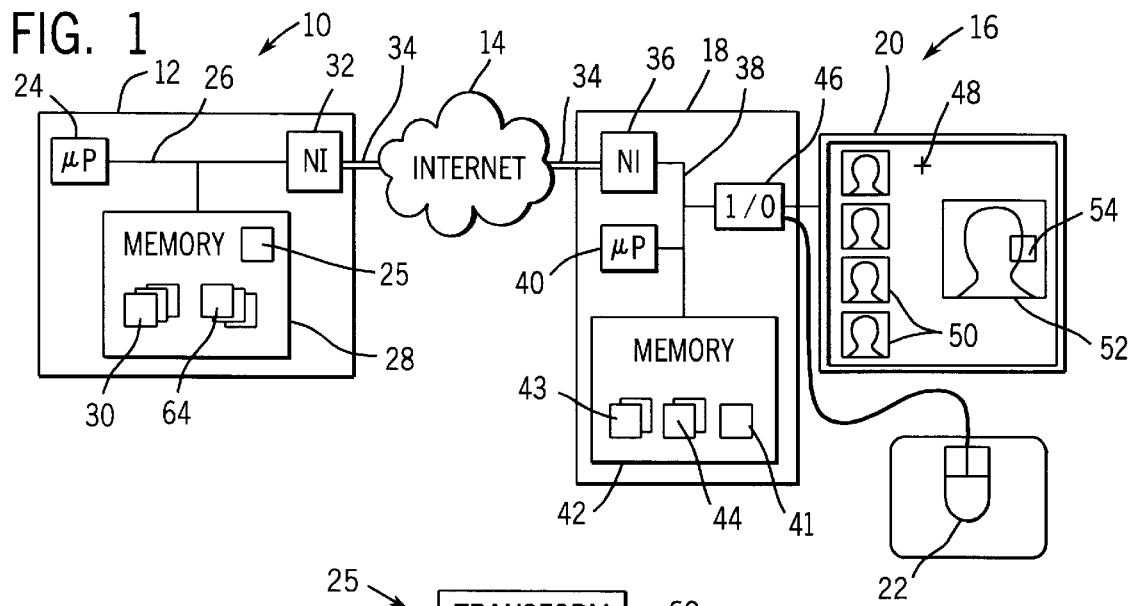
FIG. 1 is a schematic representation of a transmission site and receiving site interconnected by a communication link for communication of image data.

Referring now to FIG. 1, an example image transmission system 10 on which the present invention may be used, includes an image transmitting server 12 connected by a communication link such as the Internet 14 to an image receiving terminal 16 which may include a desktop computer 18 having a display device 20 and a cursor control device 22.

The image transmitting server 12 includes a microprocessor 24 connected by an internal bus 26 to a memory 28. The memory 28 holds a server operating program 25 as will be described and one or more digitized images 30. The internal bus 26 also connects to a network interface 32 which provides a link between the bus 26 and a network transmission line 34 of the Internet 14.

At the receiving end, the network transmission line 34 is connected to a network interface 36 of the desktop computer 18. The network interfaces 32 and 36 are of conventional construction and may, for example, be telephone line modems. The network interface 36 of the desktop computer 18 connects to an internal bus 38 which joins the network interface with a microprocessor 40 of the desktop computer 18 and a memory 42. The memory 42 includes a stored program 41 necessary for implementing the present invention's image transmission protocol as will be described. Memory 42 may also store one or more images 44 having been received from the image transmitting server 12.

The bus 38 also connects to an I/O port 46 which communicates with the display device 20 and the cursor control device 22. Generally, the display device 20 will display images 44 that are stored in memory 42. The cursor control device 22 may move a cursor 48 about the display area of the display device 20 whose coordinates may be input to the microprocessor 40 upon pressing of a switch on the cursor control device 22. As depicted, the display device 20 may display a series of small postage stamp images 50, or larger images 52, and may display rectangles defining a region of interest 54 enclosing a portion of the image 52 as defined by the cursor control device 22.

The hardware of the image transmitting server 12 and image receiving terminal 16 and the details of their electrical interconnection via a network such as the Internet 14 is well understood to those of ordinary skill in the art.

Pre-processing of Image Data

The present invention provides improved efficiency in transmitting digitized images 30 from the image transmitting server 12 to a display device 20 on an image receiving terminal digitized images 30, the efficiency of the transmission is not gained solely through reducing the amount of data describing the image, but rather by facilitating interaction with the viewer of the image so that as the image is transmitted, the user may refine the description of what data is transmitted and limit the transmitted data to the particular needs of the individual.

In order to accomplish this, the invention first orders the data of the image for transmission so that a low detail version of the image may be sent first followed by succeeding refinements of that image. This allows the user, as the data is being received, to view a rough version of the image and to make decisions as to whether greater detail is needed, either in the entire image or a portion of the image, defined by the user. For example, the user viewing the low detail image of a postage stamp image 50 provided by the initial transmission of the ordered data of the digitized images 30, may instruct the computer to continue the transmission adding to the postage stamp image to create a larger image 52. Alternatively, the larger image 52 may be transmitted in low detail to hold the same data as the postage stamp image 50, for example, and further data transmission may be suspended for all areas of the image 52 except for a region of interest 54 defined by the user. In the simplest case, the user or the image receiving terminal 16 may provide information as to resolution limits imposed by the image receiving terminal 16 and the ordered data may be stopped when those resolution limits are received.

In each of these cases, progressive transmission coupled with the relatively long duration of the transmission of image data, allows modification of the transmission process. The ordering of the data means that if greater detail images are ultimately required, the first sent data is not wasted, but simply combined with the later sent data to improve the total image quality.

Figure 2:
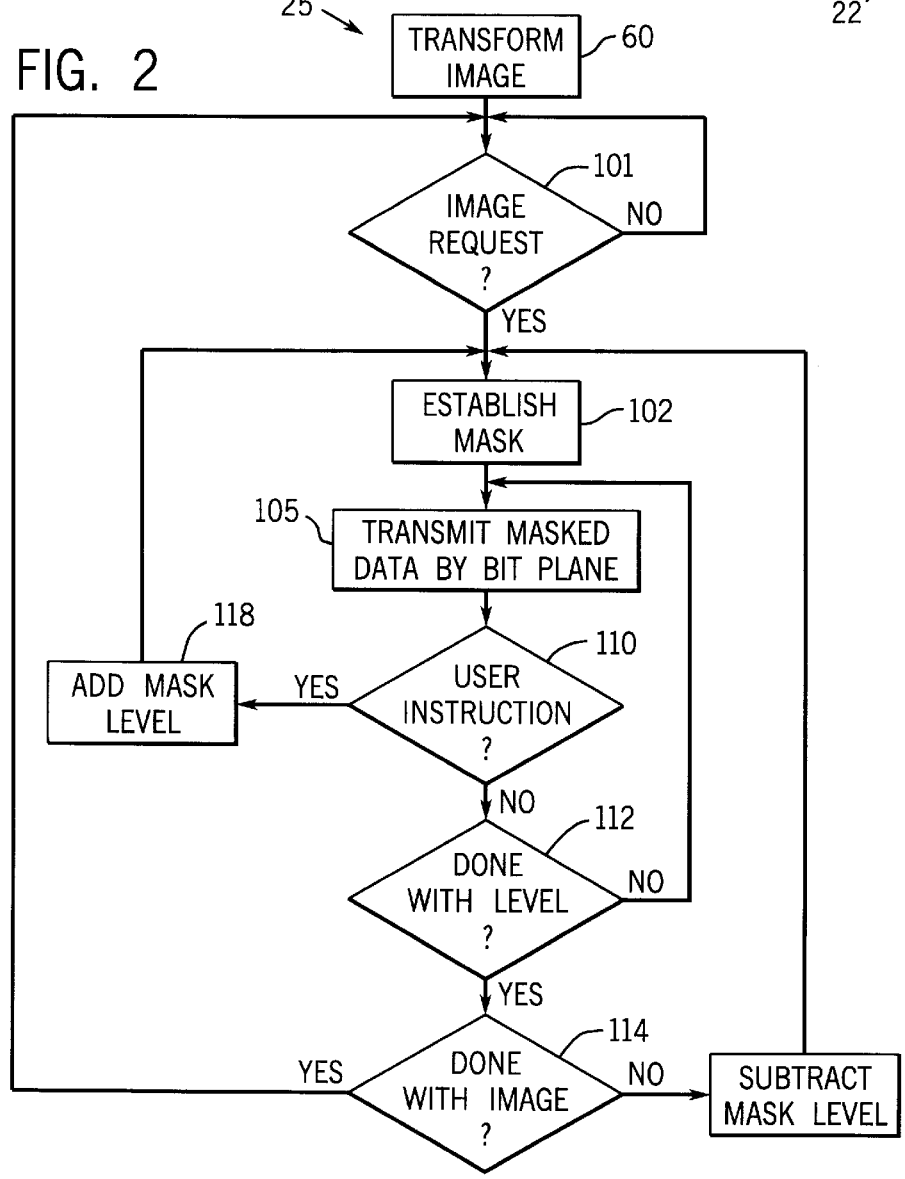
FIG. 2 is a flow chart showing the step of a program executed by the image transmitting server of FIG. 1 in transforming and ordering image data for transmission to the receiving site in response to commands from the receiving site.

Referring to FIG. 2 in the first step of this process indicated by process block 60, data from a conventionally digitized image 30 is transformed. The transformation accomplishes three purposes. The first is to generally disperse the data of the digitized images 30 from proximate points within the image throughout the data of the transformation. In this way, transmission of only part of the transformed data will provide image data in the recovered image throughout the entire area of the recovered image. Thus, the recovered image as it is reconstructed from transmitted transform data, tends to fill in evenly providing progressively greater "focus" as further data is received. This is in contrast to straight transmission of a portion of the image data which might, for example, provide a high definition view of only the upper left hand corner of the image leaving the remaining portions of the image blank.

The second purpose of the transform is so that in any portion of the image, the data that provides the most information to the human eye, is transmitted first. Generally, this data is that which defines edges of objects. These first two goals address the desire to transmit the most visually significant data first.

Finally, the transformation provides image data that is susceptible to additional compression techniques.

Several transformations may be used at this step, however, in the preferred embodiment, the transform selected is the Haar transform, which is computationally efficient and provides a number of advantageous properties as will be described. The data of the digitized image 30 will be transformed to produce a transformed image 64 (shown generally in FIG. 1), in this case having an identical number of transformed pixels 66 in corresponding rows and columns.

Figure 3:
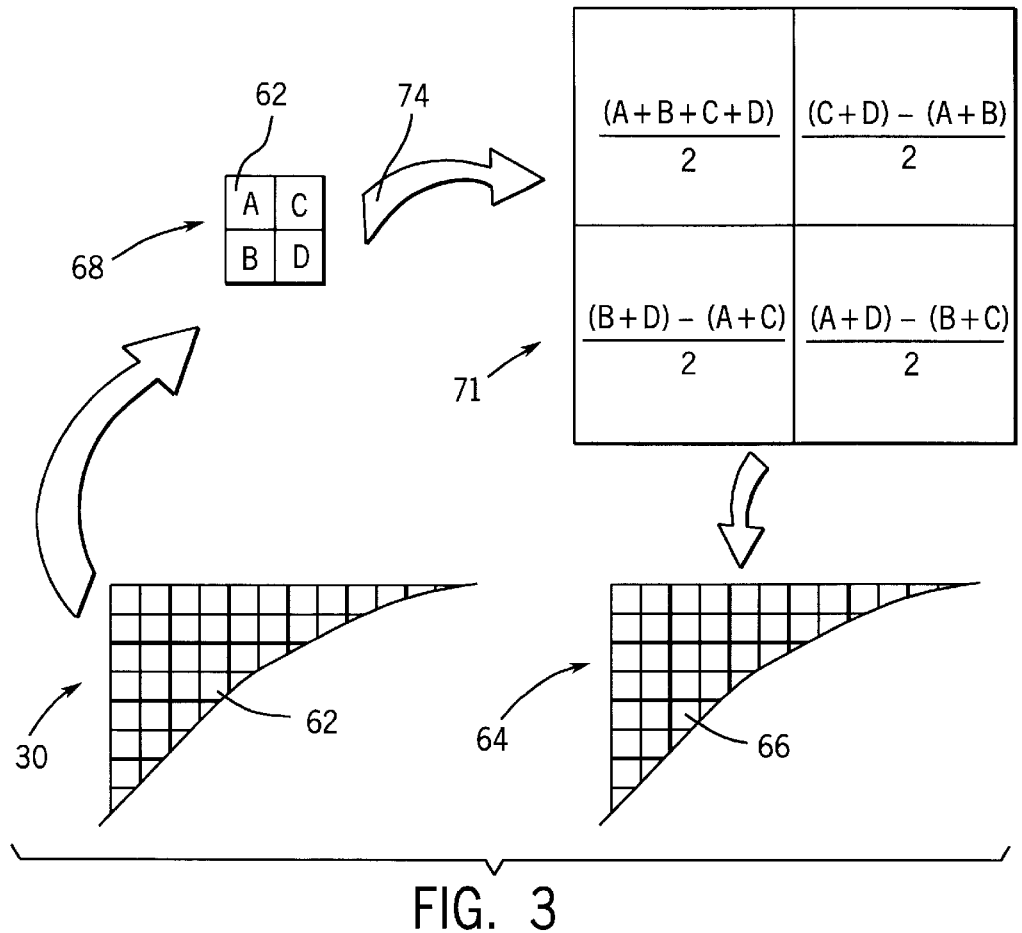
FIG. 3 is a schematic diagram illustrating the first steps of transforming image data of combining pixel values, as employed by the transmission site executing the program of FIG. 2.
Figure 5:
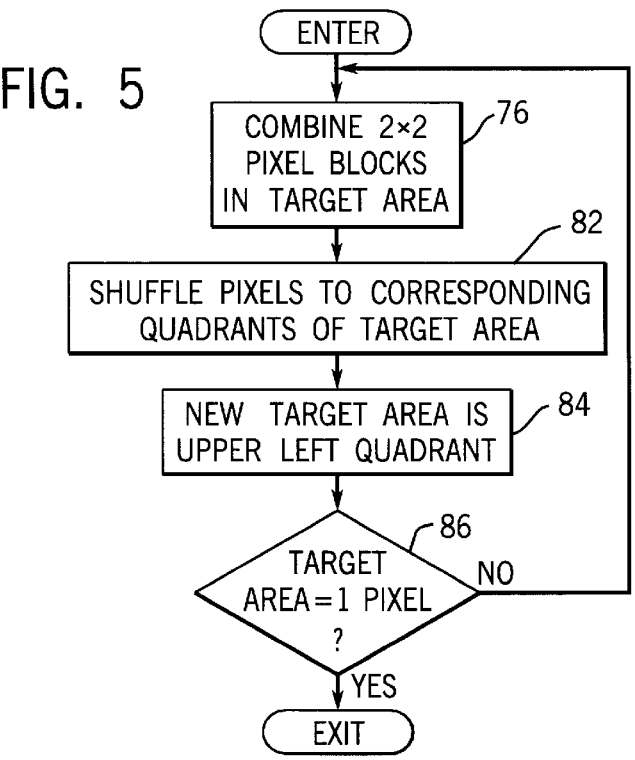
FIG. 5 is a flow chart showing the steps of the image transformation illustrated by FIGS. 3 and 4.

Referring now to FIGS. 3 and 5, the Haar transform receives a digitized image 30 composed of image pixel 62 defined in an even number of rows and columns of the digitized images 30. As is generally understood in the art, the value of each image pixel 62 describes the color or intensity of the underlying image at comparable coordinates.

1. Pixel Combining

In the first step of a Haar transform indicated by process block 76, a target area of the digitized image 30 is divided into 2×2 pixel blocks 68. Initially the target area is the entire digitized image 30. Each of the four values of the four image pixels 62 of a pixel block 68 combines to produce four values of transformed pixels 66 in a transformed pixel block 71. The four values of the transformed pixels 66 are then placed in corresponding locations in the transformed image 64. For this reason, it will be understood that the transformed image 64 may make use of the same memory as the digitized image 30, simply replacing the digitized image 30 as the transform progresses. This can be important in conserving memory during the transformation process.

Consider now a single pixel block 68, in which the pixel values will be designated by the variables A, B, C and D according to the following Table I.

TABLE I

| Row No. | Column No. | Image Value | Transform Value |
|---------|------------|-------------|-----------------|
| 1 | 1 | A | (A + B + C + D)/2 |
| 2 | 1 | B | [(B + D) − (A + C)]/2 |
| 1 | 2 | C | [(C + D) − (A + B)]/2 |
| 2 | 2 | D | [(A + D) − (B + C)]/2 |

The values of the transformed pixels 66 are given in the last column of Table I as functions of the values of the image pixels 62. Inspection of this transformation indicates that the upper right hand transformed pixels 66 of the transformed pixel block 71 generally reflects the change in the image along the horizontal, or x-axis whereas the value of the transformed pixels 66 in the lower left hand corner of the transformed pixel block 71 reflects generally the change in the image along the vertical, or y-axis. The value of the lower right hand transform pixel of the transformed pixel block 71 is a cross-term needed for reversibility of the transformation and the upper left hand corner of the transformed pixel block 71 is simply the sum of the image pixels 62 of the pixel block 68 divided by two.

This value of the upper left hand corner transformed pixel 66 is significant because it represents effectively an average value of the image pixel 62 of the pixel block 68 and thus a compression of the image represented by the pixel block 68 by a factor of four.

2. Pixel Shuffling

Figure 4:
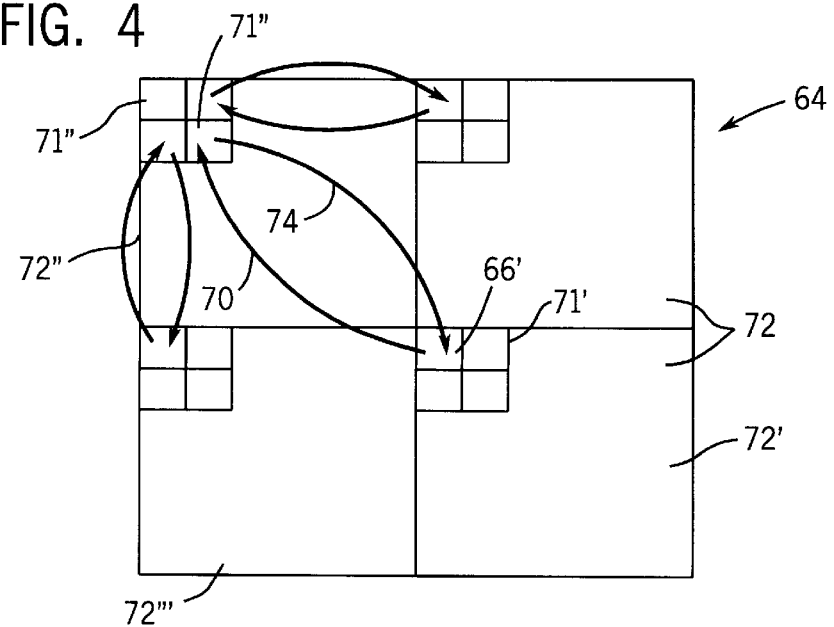
FIG. 4 is a schematic diagram illustrating the second steps of transforming image data of shuffling the pixel values to respective quadrants.

Once each pixel block 68 of the digitized image 30 has been transformed to produce a complete transformed image 64, the pixels of each transformed pixel block 71 are rearranged or 'shuffled'. Referring to FIG. 4, the transformed image 64 is divided into four quadrants 72. For each transformed pixel block 71 of the transformed image 64 in each quadrant 72, the upper left hand pixels transformed pixel block 71 are moved to the upper left hand quadrant 72. The upper right hand pixels are moved to the upper right hand quadrant 72. The lower left hand transformed pixels 66 are moved to the lower left hand quadrant 72, and the lower right hand pixels are moved to the lower right hand quadrant 72. There, they fit within the corresponding transformed pixel block 71 that matches the transformed pixel block 71 of the quadrant 72 from which they derived.

Thus, for example, consider a transformed pixel 66' in the upper left hand corner of a transformed pixel block 71' in the upper left hand corner of the quadrant 72' in the lower right hand corner of the transform image 64. This transformed pixel 66' moves as indicated by arrow 70 to a transformed pixel 66" in the lower right hand corner of a transformed pixel block 71" in the upper left hand corner of quadrant 72" in the upper left hand corner of the transformed image 64. As indicated by arrow 74, the pixel replaced by the movement of the transformed pixel 66' moves back downward to the vacant spot in quadrant 72' left by transformed pixel 66'.

Figure 6:
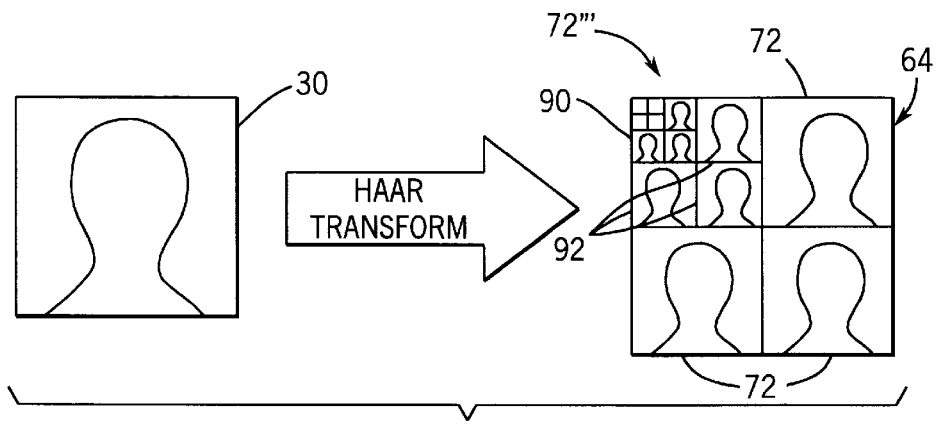
FIG. 6 is simplified representation of the transformation of FIGS. 3, 4, and 5 showing the repeating steps of the transformation on the lower left hand corner of the transformed data.

This shuffling of the pixels of each transformed pixel block 71 into their respective quadrants 72 is indicated by process block 82 of FIG. 5. Referring to FIG. 6, the lower left hand quadrant, and upper and lower right hand quadrants will have possibly unrecognizable edge enhanced versions of the digitized image 30 a result of the transformations of the second, third and fourth rows of Table I above. Because this upper left hand quadrant 72''' receives the transformed pixels 66 that are simply the sum of their neighbors in the pixel blocks divided by two this quadrant will contain an identical picture to the digitized image 30 but in lower detail as a result of this intrinsic adding process.

Referring now to FIGS. 5 and 6, the target area is now redefined to be only the upper left hand quadrant 72''' of the transformed image 64, as indicated by process block 84.

If this new target area has greater than one transformed pixel 66 (as it will in this case) as determined by decision block 86, the transformation process loops back to process block 76 and the new target area is again processed as has been described with the new target area being treated as an image 30.

After completion of process block 76 and 82 on the upper left hand quadrant of the transformed image, this quadrant, is in turn divided into quadrants, and has its upper left hand corner made the new target area. As before, this new target area is again processed by process block 76 and 82. This repeated division of the upper left hand quadrant continues until the target area is a single pixel, that single pixel having a value which is the sum of all other pixels in the image.

The Haar transform is described in White, R. L. 1992, "High Performance Compression of Astronomical Images," published on the Internet by ftp from stsci.edu.

Referring to FIG. 6, the transformed image 64 thus arranges itself so that if one takes only the data of the transformed image 64 in a rectangle having a height and a width (measured in pixels) equal to the height and width of the image 30 divided by $2^n$ (where n is an integer), then sufficient data for a representation of the full digitized image 30 will be contained by each rectangle but with increasing detail as one moves to larger and larger rectangles. These rectangles will be termed 'proportionate rectangles'. For example, the lower upper hand quadrant 72''' of the transformed image 64 as depicted in FIG. 6 is a proportionate rectangle which contains all the information necessary to fully reconstruct the digitized image 30 at half resolution (one quarter of the data), that is with the image pixel 62 of the digitized image 30 in each pixel block 68 averaged together. Note that the image shading by pixel averaging usually produces a much better quality image than merely picking every other pixel out of the original image. Similarly, the upper left hand quadrant 90 of the upper left hand quadrant 72''' of the transformed image 64, is a proportionate rectangle which contains all the information necessary to reconstruct the entire digitized image 30 at one-fourth resolution, that is, with each 4×4 block of image pixel 62 averaged together.

If one were to transmit this latter quarter resolution image, that is transmitting only the portion of the transformed image 64 of the proportionate rectangle of the upper left hand quadrant 90 of the upper left hand quadrant 72''', and then were to decide that a half resolution image was required, only additional blocks 92 would need to be transmitted. They could be combined with upper left hand quadrant 90 that had previously been transmitted to reconstruct the half resolution image. This feature makes it extremely simple to transmit a postage stamp image 50 and then follow it with a higher resolution image without losing time or discarding data. A nearly arbitrary size of postage stamp image can be transmitted by using only the data encompassed by some proportionate rectangle located in the upper, left hand corner of the transformed image 64.

Referring again to FIG. 2, once the image has been transformed as indicated by process block 60, it is stored in the memory of the image transmitting server 12. Only a single transformed image 64 is required to satisfy requests for a variety of different resolutions of that image such as may be needed for different types of machines. By selecting the previously transformed data in different sized proportionate rectangles and only transmitting that data, different resolutions of images may be transmitted. The transformation process thus can be performed in advance prior to any requests being received.

Transmission Order of the Transformed Data

Figure 8:
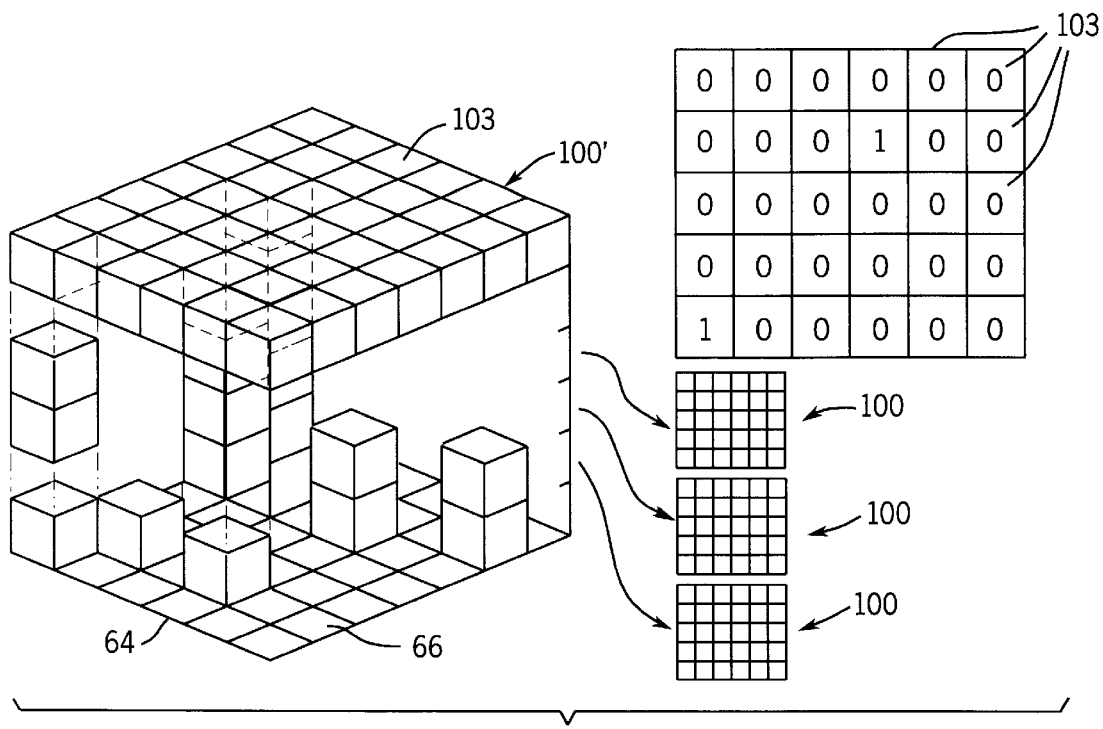
FIG. 8 is a schematic representation of the ordering of the transformed image data represented as a data cube for transmission per the program of FIG. 2.

Referring now to FIG. 8, the data of the transformed image 64 may be represented as a cube having a base equal to the area of the transformed image 64 and a height divided into a series of stacked bit planes 100 for each bit of a transformed pixel 66. Thus the values of the transformed pixels 66 are depicted as vertically aligned blocks, one block for each bit of the word representing the value of the pixel. The most significant bits are the highest from the base. The binary representation of the image data in this cube form shall be termed an "image cube" 104.

The higher bit planes 100 of the image cube 104 correspond generally to the information of most significance to the eye. Accordingly, as will be described in detail below, generally the most significant bits of those transformed pixels 66 are transmitted first (as bit plane 100') for the entire transformed image 64 followed by the next most significant bits and so forth. Because the Haar transform allows negative values of transformed pixels 66, a second bit plane, not shown, indicating negative values for the transformed pixels 66 may be transmitted along with the first bit plane.

Referring again to FIG. 2, after transformation of the digitized image 30 as indicated by process block 60, the program operating the image transmitting server 12 awaits a request for an image as indicated at decision block 101. Typically, such a request will be of one three kinds: a) a request for the entire image until notified otherwise, b) a request for the entire image limited by predetermined resolution contained in the request, or c) a request for a postage stamp version of the image.

When any of these requests is received, the program run by the image transmitting server 12 proceeds to process block 102 and a mask is established for the transformed image 64 of the image cube 104. In the first case, the mask (at least initially) is the entire volume of the image cube 104 as shown by volume 1 in FIG. 9*a*. In the second case the mask is columnar corner of the image cube 104 having a proportionate rectangle for a base as shown by volume 1 in FIG. 11*a*. For a postage stamp image 50, the mask will generally be a rectangular volume of height equal to the height of the image cube 104 and a base equal to a proportionate rectangle as has been described as shown by volume 1 in FIG. 10*a*. Mask shapes will be discussed further below.

Once the mask has been determined, at process block 105, the data of the masked area is transmitted.

Generally, within the masked area, a topmost bit plane 100' is transmitted first. Bit plane 100 has an element 103 for each transformed pixel 66 of the transformed image 64 which can be either a 1 or a 0 depending on whether the most significant bit of the transformed pixel 66 is 1 or 0. For a transform space that has 8 bits of depth (that is approximately 256 tonal variations in digitized image 30), there will be 7 bit planes 100, (one plane for 7 significant bits of magnitude and one for the sign of each bit). To transmit the complete digitized image 30, all of the elements 103 of the first bit plane 100' are sent first followed by all the elements 103 of the next bit plane 100 until all bit planes 100 have been transmitted.

It should be noted that the bit planes 100 for the highest order bits which are sent first are relatively sparse, meaning they have many zero valued elements 103. Thus, these bit planes may be easily compressed by techniques that tally continuous runs of zeros and transmit the tally rather than the zeros themselves.

Referring to FIGS. 2 and 9*a* and 9*b*, if the original image request at decision block 101 is for the entire digitized image 30, then the mask includes the volume labeled '1' and the entire image cube 104 and is transmitted starting at the top most bit planes as described. In FIG. 9, the volume labeled '1' is limited in height reflecting a changing of the mask during transmission as will be described.

Referring to FIGS. 2 and 11*a* and 11*b*, if the original image request at decision block 101 is for a limited resolution image, for example to provide for faster transmission or to match the limitations of the desktop computer 18, then the mask is made equal to the volume labeled '1' comprising the portion of the image cube 104 of full height but with a base being a proportionate rectangle 106. The size of the proportionate rectangle 106 is decreased if a lower detailed image is requested and increased if a greater detailed image is requested in even divisors of the base dimensions of the image cube 104 as has been described. When received, the limited data of mask '1' can be displayed either as a full size image of lower resolution or a smaller image as depicted utilizing the full resolution of the display device 20.

Alternatively, the image requested at decision block 101 may be for a postage stamp image 50 providing relatively little detail and normally displayed in extremely small format on the display device 20. In this case, the mask area is the volume labeled '1' as depicted in FIG. 10*a* being a rectangular column position in the upper left hand corner of the transformed image 64.

In any of these cases, during the transmission of the data of region 1 of the image cube 104, the program checks to see if there has been a user instruction transmitted by the user of the image receiving terminal 16 as will be described below. Assuming there is no such instruction, the program proceeds to decision block 112 to see if the given level of data transmission, that is all the data of the current masked volume, has been transmitted. If not, the program loops back to the top of process block 105 to continue transmission.

Dynamic Redefinition of the Image Field

Referring now to FIGS. 9*a* and 9*b*, the ability of the invention to progressively send the data, so that the user quickly has an overview of the image, allows considerable savings in transmission time insofar as it allows the user to select a portion of the image and to limit future transmissions to that portion of the image. In this way, only that portion of the image improves in quality without the need of raising the detail level of the remainder of the image which remains as a general locator of areas of interest. Referring also to FIG. 2, in this situation after initial transmission of image data and absent a user instruction at decision block 110 at decision block 112, the program loops back to process block 105 for the transmission of an additional bit plane. At some point in viewing the larger but low detail image 116 provided by the transmission of a mask '1' of the image cube 104, the user may select a smaller region of interest 54 (in this case in the lower left hand corner of the digitized image 30) in which greater detail is required.

This request together with a definition of the region of interest 54 is transmitted to the image transmitting server 12 via the Internet 14 and, at decision block 110, the program branches to process block 118 where a new mask level is generated. The new mask in this case will be a number of vertical columns of data labeled as volumes '2' in FIG. 9a.

Now at process block 105, the data transmitted is only that within the masked volume labeled '2'. This masked volume labeled '2' is much smaller than the entire image cube 104 or even the remaining data beneath the volume labeled '1' and thus is relatively quickly transmitted.

Figure 7:
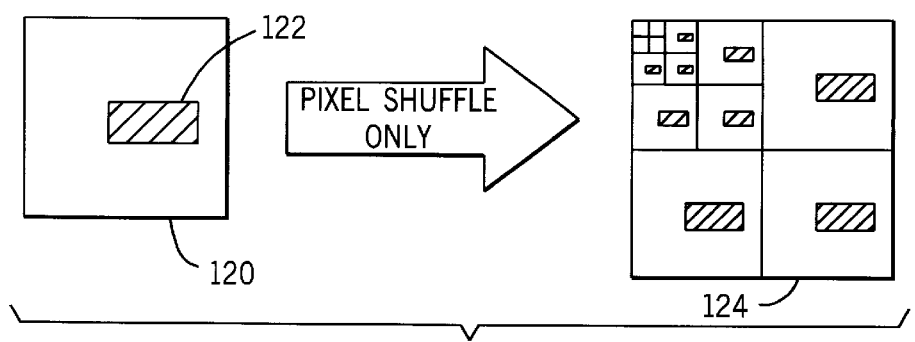
FIG. 7 is a figure similar to that of FIG. 6 showing a transform of a mask field employing only the data shuffling of FIG. 4 without the combining of pixel values of FIG. 3 such as may used to identify relevant data in a transformed image as requested by a user at the receiving site.

Generally the mask volume labeled '2' will be quite complicated in shape but is easily determined by performing the bit shuffling steps of the Haar transform without the bit combining steps on a region equal to that of the region of interest 54 generated by the user. Referring to FIG. 7, when the image transmitting server 12 receives the definition of region of interest 54, a mask 122 may be established in a mask image 120 having the same dimensions as the region of interest 54. Each of the bits within the mask 122 are set equal to one whereas the remainder of the mask image 120 is set to zero. The steps of the Haar transform described with respect to FIG. 5 are then performed on the mask image 120 omitting only step 76. At the conclusion of this process, a mask plane 124 has been developed in which those bits which are set to one define the columns depicted in FIG. 9a.

As the higher resolution detail of the image in region of interest 54 are filled in, additional user instructions may be provided that cause further transmission of data for yet a smaller region within region of interest 54. In this case at process block 118, additional mask levels are generated.

Once the data of the current mask is completely transmitted, the program proceeds from decision block 112 to decision block 114 to see if the transmission is complete. The transmission will be complete if there are no pending masks of an earlier level that need data transmitted. In the example of FIG. 9a and 9b, after the mask volume labeled '2' is fully transmitted, the remainder of the image cube 104 may be transmitted automatically.

If there are no other mask levels, or for the case where data transmission for the mask '1' is finished in the examples of FIGS. 10 and 11, the program loops to the top of decision block 101 to await the request of an additional image.

At decision block 101, the user may request the full image version of the postage stamp image 50. Then at process block 102, the mask is expanded to the volume labeled '2' of FIG. 10 excluding region 1 that has been previously transmitted. The region 1 data which has been previously transmitted may be combined with this new region 2 data by the image receiving terminal 16 and need not be retransmitted nor discarded. The pre-existence of the data of the mask volume labeled '1' data means that upon the request for a larger image, a larger image 52 will immediately be visible to the user (using the previously transmitted data) albeit with low detail. This image will begin to be filled in as new data is provided by mask volume '2'.

At the image receiving terminal 16, each bit plane 100 is combined with the previous bit planes transmitted, if any, to produce a new composite bit plane providing more significant digits to transformed image 64. The image receiving terminal 16 retains in memory 42 the raw transferred image data 43 of the image cube 104 so that it may be easily combined with the new transmitted data of the data cube without the necessity of reverse transforming the reconstructed image as additional data of the image cube 104 is received. The reverse transformation of the transformed image 64 into an image will be understood to those of ordinary skill in the art to be a straightforward reversal of the process described for the original transformation of process block 60 of FIG. 2. That is, starting with the upper left hand corner of four 2×2 blocks of bits are first shuffled exactly as described with respect to FIG. 4 and then a reverse transformation is accomplished of the bit values on a 2×2 pixel block basis solving for values A, B, C and D from the equations provided in Table I with respect to FIG. 3.

Although the Haar transform is preferred for its quality of allowing a relatively simple transformation of the digitized image 30 which provides an intrinsic ordering of the image data so that the entire image comes into view at progressively greater levels of detail at the receiving station as it is transmitted, it will be understood that other transforms may also be used including, for example, the Fourier transform and the like.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

We claim:

1. A method of transmitting a digital image comprised of spatially arrayed pixels denoting shade information from a transmission site to a reception site, the method comprising the steps of:
   (a) ordering the image data according to a pre-defined visual significance of the image data;
   (b) transmitting in the ordering of step (a) the image data of a first field of the digital image from the transmission site to the reception site;
   (c) receiving the image data at the reception site and displaying the first field of the digital image as the image data is received;
   (d) during the transmission of the image data of the first field, accepting from the reception site, instructions defining a second field within the first field; and
   (e) when instructions are received continuing the transmission in order of the image data excluding data not in the second field;
   (f) when instructions are not received, continuing the transmission of all image data until completion;
   including the step of:
   (g) upon completion of the transmission of the image data for the second field continuing the transmission in order of the excluded data of the first field.

2. The method of claim 1 wherein step (b) of transmitting, in order, the imaged data includes a step of compressing the ordered data prior to its transmission and wherein step (c) of receiving the image data includes the step of decompressing the ordered data after its receipt.

3. The method of claim 1 wherein the ordering of the image data includes the steps of:
   (i) performing a Haar transform on pixels of the digital image to produce a transformed image having corresponding transform pixels;
   (ii) ordering the data of the transform pixels so that mathematically more significant bits of a transform pixel are placed in order before mathematically less significant bits of any other transform pixel.

4. A method of transmitting a digital image having an extent and comprised of spatially arrayed pixels denoting shade information from a transmission site to a reception site, the method comprising the step of:
   (a) ordering image data of the digital image to disperse the image data from proximate points within the digital image throughout the order;

(b) transmitting, in order, a first portion of the image data from the transmission site to the reception sites;

(c) receiving the image data at the reception site and displaying the entire extent of the digital image at reduced detail;

(d) accepting from a viewer of the displayed digital image at the reception site, instructions to produce the entire digital image in higher detail;

(e) transmitting in order a second portion of the image data; and (f) combining the first and second portions of the image data at the reception site to produce the entire digital image in higher detail;

wherein step (c) of displaying the first portion of the image data and step (f) of displaying the first and second portions of the image data, adjusts the size of the displayed image to have comparable spatial resolution;

wherein the first, displayed image is a small image and the second displayed image is a larger image.

5. The method of claim 3 wherein ordering of the image data includes the steps of:

(i) performing the Haar transform on pixels of the digital image to produce a transformed image having corresponding transform pixels;

(ii) ordering the data of the transform pixels so that mathematically more significant bits of a transform pixel are placed in the order before mathematically less significant bits of any other transform pixel.

6. The method of claim 3 wherein the data of the second portion is equal in amount to the data of the first portion times four raised to an integer power.

7. The method of claim 1 wherein ordering of the image data includes the steps of:

(i) performing the Haar transform on pixels of the digital image to produce a transformed image having corresponding transform pixels; and (ii) ordering the data of the transform pixels so that mathematically more significant bits of a transform pixel are placed in the order before mathematically less significant bits of any other transform pixel.

* * * * *